United States Patent Office 3,445,486
Patented May 20, 1969

3,445,486
TETRACHLORO-ALKYL-CYCLOHEXENE-DIONES
Wilhelm J. Schnabel, Branford, and Trescott B. Larchar, Sr., Hamden, Conn., assignors to Olin Mathieson Chemical Corporation, a corporation of Virginia
No Drawing. Filed July 5, 1966, Ser. No. 562,531
Int. Cl. C07c 49/44, 49/00
U.S. Cl. 260—396          5 Claims This invention relates to tetrachloro-alkyl-cyclohexene-diones having the following general formula:

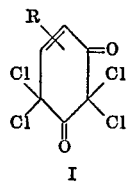

I wherein R represents an alkyl moiety. This invention also relates to a process for preparing said tetrachloro-alkyl-cyclohexene-diones.

It is known that ortho- and para-phenylenediamines are unstable and susceptible to oxidation. Thus, for example, o-toluenediamine readily oxidizes upon exposure to air, whereas the pure meta-isomer can be heated, distilled, exposed to air, etc. without undergoing oxidation.

The difference in reactivity of the meta-isomers with respect to the ortho- and para- isomers is further illustrated by a comparison of the products obtained by halogenating the respective compounds. Thus, the ortho-isomer when chlorinated also undergoes oxidation as described in Th. Zincke, Ann. 296, 136, where it was reported that chlorination of the HCl salt of o-phenylenediamine in an aqueous system provided the fully chlorinated, non-aromatic hexachloro-cyclohexene-(1)-dione-(3,4 or 4,5). The extreme stability of the meta-diamines is well illustrated, by the reaction reported in J. Am. chem. Soc. 18, 470, wherein 2,4,6-tribromo-1,3-diamino-benzene was obtained by brominating m-phenylene diamine and salts derived therefrom in an aqueous reaction medium. The amino groups and the aromatic structure of the meta-diamine were retained.

Now it has been found that the chlorination of alkyl-substituted meta-phenylenediamines under selected reaction conditions surprisingly and unexpectedly results in oxidation and selective chlorination of the aromatic ring. Thus, a series of tetrachloro-alkyl-cyclohexene-diones (I) having a hydrogen attached to an olefinic double bond is provided in high yields and excellent purity.

Broadly, the process of this invention comprises chlorinating an alkyl-substituted meta-phenylenediamine, or a dihydrochloride salt thereof, in an aqueous medium at a reaction temperature between about 0° and 100° C. In a preferred embodiment, the dihydrochloride salt is prepared in situ by adding hydrochloric acid to a mixture of the diamine and water, and chlorine is passed into the resulting suspension of the dihydrochloride in hydrochloric acid. In all embodiments of this invention, the pressure of water in the reaction miture during chlorination is an essential process requirement.

The chlorination step proceeds in accordance with the following general equation:

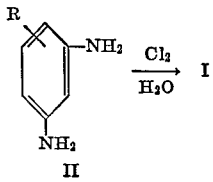

II wherein R is as previously described. Where the 1-alkyl-2,4-phenylene diamine isomer is employed as the starting material, the reaction product is predominately the 1,1,3,3-tetrachloro-5-alkyl-5-cyclohexene-2,4-dione. Conversely, chlorination of the 1-alkyl-3,5-phenylene diamine isomer provides a product comprised mainly of the 1,1,3,3-tetrachloro-6-alkyl-5-cyclohexene-2,4-dione.

The alkyl-substituted meta-phenylenediamines having the Formula II are readily provided in accordance with known techniques by alkylation of benzene followed by nitration and hydrogenation. While any diamine represented by Formula II is utilizable in the process of this invention, preferred embodiments employ those compounds wherein R is lower alkyl, i.e., alkyl having from 1 to 5 carbon atoms. Thus, an alkyl halide such as ethyl bromide, i-propyl bromide, amyl chloride and the like is reacted with benzene in the presence of a Friedel-Crafts catalyst to provide the corresponding alkyl-substituted benzene, which is then nitrated and hydrogenated to provide the desired lower alkyl-substituted meta-phenylene diamine.

Although the chlorination will proceed over a temperature range from about 0° C. to about 100° C., a temperature between about 50° C. and 80° C. is preferred. After completion of the reaction, the desired tetrachloro alkyl-cyclohexene-dione I is also isolated from the reaction mixture by conventional techniques, such as separation, extraction, and the like and the crude product purified by fractional distillation and/or recrystallization from such solvents as isopropanol, butanol, ethyl acetate, hexane, heptane, petroleum ether, etc.

The tetrachloro-alkyl-cyclohexene-diones I of this invention are useful as flame-retardant agents in the preparation of polyurethane foams. Certain physical properties of the resulting foams, such as humid aging characteristics, are enhanced by the presence of the alkyl moiety in the structure of the tetrachloro-alkyl-cyclohexene-diones. In the preparation of the foams, compounds I are dissolved in polyols prior to reaction of the polyols with isocyanates to provide the desired polyurethane foams. Thus, 1,1,3,3-tetrachloro - 5-methyl - 5-cyclohexene-2,4-dione is added to the triol obtained by oxypropylating glycerine and the resulting solution reacted with toluene-diamine isocyanate in the presence of a blowing agent and a reaction catalyst to provide a foam which is remarkably flame-retardant.

Compounds I are also useful as flame-retarding agents in various coating applications. The reactive olefinic double bond permits reaction with a wide variety of resins and waxes. For example, 1,1,3,3-tetrachloro-5-alkyl-5-cyclohexene-2,4-dione reacts with styrene to provide a material suitable for coating cellulosic materials. It is highly advantageous to provide a flame-retarding agent in chemical combination rather than physical admixture with a component of the flame-proofed system, since migration and/or exudation of the agent from the system is thereby precluded.

The following example will serve to illustrate the practice of this invention.

EXAMPLE

A mixture of 244 grams (2.0 moles) of 2,4-toluenediamine and 400 ml. of water was charged to a 3-necked flask equipped with a thermometer, a gas-inlet tube and a stirrer. To this was added gradually, with stirring, 800 ml. of concentrated hydrochloric acid and the resulting mixture heated to 60°–65° C. Chlorine gas was passed into the mixture at a rate of about 1.5–2.0 grams per minute. After four hours, all the solid materials were converted to an oily liquid which settled on the bottom of the flask. The chlorine feed was terminated, the mixture cooled to 20° C. and the oily liquid extracted with ether. After washing the extract with aqueous sodium bicarbonate solution and drying over sodium sulfate, the ether was evaporated, yielding 400 grams of a liquid residue. Fractional distillation of the residue provided 358 grams (68.3% yield) of a slightly yellowish liquid distilling at 99°–104° C. Under 0.1–0.6 mm. of mercury pressure. The liquid solidified on standing and a sample of the solidified product was recrystallized from petroleum ether to provide white crystals melting at 69° C.

The following analytical data revealed that 1,1,3,3-tetrachloro-5-methyl-5-cyclohexene-2,4-dione had been obtained.

*Analysis.*—Calc'd for $C_7H_4Cl_4O_2$: C, 32.09; H, 1.54; Cl, 54.14. Found: C, 31.95; H, 1.69; Cl, 54.3; 53.8.

Molecular Weight Calculated: 261.93. Found (Mass Spectroscopy): 262.

The structure of the product was confirmed by infrared analysis which showed the presence of two keto groups at 5.7μ and 5.8μ, the absence of hydroxyl, no aromatic structure, and an olefinic double bond at 6.2μ with additional absorption at 3.2μ. Nuclear magnetic resonance likewise revealed no aromatic structure, but did indicate a methyl group bound to an olefinic double bond and a vinyl-type hydrogen atom.

What is claimed is:

1. A compound having the formula:

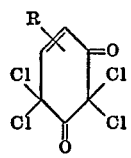

wherein R is alkyl having from 1 to 5 carbon atoms.

2. The compound of claim 1 having the name 1,1,3,3-tetrachloro-5-methyl-5-cyclohexene-2,4-dione.

3. A process for preparing the compound of claim 1 which comprises chlorinating an alkyl-substituted phenylenediamine having the formula:

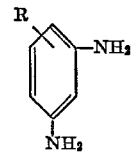

or the dihydrochloride salt thereof, wherein R is alkyl having from 1 to 5 carbon atoms in an aqueous reaction medium at a reaction temperature between about 0° and 100° C.

4. A process for preparing the compound of claim 1 which comprises chlorinating an alkyl-substituted phenylenediamine dihydrochloride having the formula:

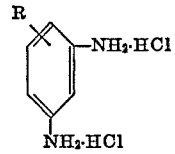

wherein R is alkyl having from 1 to 5 carbon atoms in a hydrochloric acid reaction medium at a reaction temperature between about 0° and 100° C.

5. The process of claim 4 in which 2,4-toluenediamine-dihydrochloride is chlorinated to provide 1,1,3,3-tetrachloro-5-methyl-5-cyclohexene-2,4-dione.

References Cited

I. L. Finar: Organic Chemistry, vol. I, Lungman's, London, 1933, QD 251 F56, p. 568.

LORRAINE A. WEINBERGER, *Primary Examiner.*

L. A. THAXTON, *Assistant Examiner.*

U.S. Cl. X.R.

260—2.5